United States Patent
Haskell et al.

(10) Patent No.: US 8,937,997 B2
(45) Date of Patent: Jan. 20, 2015

(54) SCALABLE VIDEO CODING/MULTIPLEXING COMPATIBLE WITH NON-SCALABLE DECODERS

(75) Inventors: Barin Geoffry Haskell, Mountain View, CA (US); David William Singer, San Francisco, CA (US); Thomas Pun, Kowloon (HK); Hsi-Jung Wu, San Jose, CA (US); James Oliver Normile, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1738 days.

(21) Appl. No.: 11/710,183

(22) Filed: Feb. 23, 2007

(65) Prior Publication Data

US 2007/0217503 A1    Sep. 20, 2007

Related U.S. Application Data

(60) Provisional application No. 60/782,807, filed on Mar. 16, 2006, provisional application No. 60/785,796, filed on Mar. 23, 2006.

(51) Int. Cl.
*H04N 19/00* (2014.01)
*H04N 19/196* (2014.01)
(Continued)

(52) U.S. Cl.
CPC . *H04N 19/00369* (2013.01); *H04N 21/234327* (2013.01); *H04N 21/2389* (2013.01); *H04N 21/2662* (2013.01); *H04N 21/4385* (2013.01); *H04N 21/64792* (2013.01); *H04N 21/6582* (2013.01); *H04N 21/8451* (2013.01);
(Continued)

(58) Field of Classification Search
None
See application file for complete search history.

(56) References Cited

U.S. PATENT DOCUMENTS

| 4,958,226 A | 9/1990 | Haskell et al. |
| 5,408,328 A | 4/1995 | Boliek et al. |

(Continued)

FOREIGN PATENT DOCUMENTS

| WO | WO03063505 A | 7/2003 |
| WO | 2004068861 A1 | 8/2004 |
| WO | WO2005055605 A | 6/2005 |

OTHER PUBLICATIONS

IEEE 100, The Authoritative Dictionary of IEEE Standards Terms, 7th ed., IEEE press, 2000, p. 1-11.*

(Continued)

*Primary Examiner* — Jeffery Williams
(74) *Attorney, Agent, or Firm* — Kenyon & Kenyon LLP

(57) ABSTRACT

Scalable video coding and multiplexing compatible with non-scalable decoders is disclosed. In some embodiments, video data is received and encoded in a manner that renders at least a base layer to be compatible with a non-scalable video encoding standard, including by assigning for at least the base layer default values to one or more scalability parameters. In some embodiments, video data is received and encoded to produce an encoded video data that includes a base layer that conforms to a non-scalable video encoding standard and one or more subordinate non-scalable layers, which subordinate non-scalable layers do not by themselves conform to the non-scalable video encoding standard but which can be combined with the base layer to produce a result that does conform to the non-scalable video encoding standard, such that the result can be decoded by a non-scalable decoder. An identification data identifying those portions of the encoded video data that are associated with a subordinate non-scalable layer is included in the encoded video data.

25 Claims, 3 Drawing Sheets

(51) Int. Cl.

| | | |
|---|---|---|
| *H04N 21/2343* | (2011.01) | |
| *H04N 21/2389* | (2011.01) | |
| *H04N 21/2662* | (2011.01) | |
| *H04N 21/4385* | (2011.01) | |
| *H04N 21/647* | (2011.01) | |
| *H04N 21/658* | (2011.01) | |
| *H04N 21/845* | (2011.01) | |
| *H04N 19/132* | (2014.01) | |
| *H04N 19/187* | (2014.01) | |
| *H04N 19/61* | (2014.01) | |
| *H04N 19/46* | (2014.01) | |
| *H04N 19/33* | (2014.01) | |

(52) U.S. Cl.
CPC ... *H04N19/00127* (2013.01); *H04N 19/00321* (2013.01); *H04N 19/00781* (2013.01); *H04N 19/00545* (2013.01); *H04N 19/00436* (2013.01)
USPC .......................................... 375/240; 375/219

(56) References Cited

U.S. PATENT DOCUMENTS

| | | | |
|---|---|---|---|
| 5,414,469 A | 5/1995 | Gonzales et al. | |
| 5,465,119 A | 11/1995 | Demos | |
| 5,467,136 A | 11/1995 | Odaka et al. | |
| 5,488,418 A | 1/1996 | Mishima et al. | |
| 5,532,747 A | 7/1996 | Yoon et al. | |
| 5,539,468 A | 7/1996 | Suzuki et al. | |
| 5,612,735 A | 3/1997 | Haskell et al. | |
| 5,619,256 A | 4/1997 | Haskell et al. | |
| 5,633,684 A | 5/1997 | Teranishi et al. | |
| 5,699,117 A | 12/1997 | Uramoto et al. | |
| 5,757,971 A | 5/1998 | Kim | |
| 5,778,097 A | 7/1998 | Nickerson | |
| 5,786,855 A | 7/1998 | Chen et al. | |
| 5,825,421 A | 10/1998 | Tan | |
| 5,886,736 A | 3/1999 | Chen | |
| 5,978,509 A | 11/1999 | Nachtergaele et al. | |
| 5,999,189 A | 12/1999 | Kajiya et al. | |
| 6,005,623 A | 12/1999 | Takahashi et al. | |
| 6,005,980 A | 12/1999 | Eifrig et al. | |
| 6,026,183 A | 2/2000 | Talluri et al. | |
| 6,043,846 A | 3/2000 | Shen et al. | |
| 6,057,884 A | 5/2000 | Chen et al. | |
| 6,097,842 A | 8/2000 | Suzuki et al. | |
| 6,144,701 A | 11/2000 | Chiang et al. | |
| 6,148,026 A | 11/2000 | Puri et al. | |
| 6,330,280 B1 | 12/2001 | Suzuki et al. | |
| 6,404,813 B1 | 6/2002 | Haskell et al. | |
| 6,707,949 B2 | 3/2004 | Haskell et al. | |
| 6,771,703 B1* | 8/2004 | Oguz et al. ................ | 375/240.03 |
| 2004/0017853 A1* | 1/2004 | Garrido et al. ........... | 375/240.16 |
| 2005/0226322 A1* | 10/2005 | Van Der Vleuten et al. ........................ | 375/240.08 |
| 2005/0254575 A1 | 11/2005 | Hannuksela et al. | |
| 2007/0160126 A1* | 7/2007 | Van Der Meer et al. ...... | 375/240 |
| 2007/0201549 A1* | 8/2007 | Hannuksela et al. .... | 375/240.01 |
| 2007/0211798 A1* | 9/2007 | Boyce et al. ............. | 375/240.16 |
| 2007/0286283 A1* | 12/2007 | Yin et al. ................. | 375/240.16 |
| 2009/0022230 A1* | 1/2009 | Kirenko ................... | 375/240.26 |
| 2011/0001642 A1* | 1/2011 | Yu et al. .......................... | 341/65 |

OTHER PUBLICATIONS

"Scalable Video Coding ? Joint Draft 4" Joint Video Team (JVT) of ISO/IEC MPEG & ITU-T VCEG (ISO/IEC JTC1/SC29/WG11 and ITU-T SG16 Q6), XX, XX, No. JVT Q201, Oct. 31, 2005, pp. 1-137, XP002372100.

Miska M. Hannuksela et al.: "M12831 Comments on VM Study Text for Scalable Video Coding (SVC) File Format (N7586)" International Organisation for Standardisation ISO/IEC JTC1/SC29/WG11 Coding of Moving Pictures and Audio, Jan. 16, 2006, pp. 1-3, 7-14, 34-36, 41-43, 47-50, 53, 54, 58-60, 62-64, XP002446962 Bangkok, Thailand.

Wang Et A.: "Scalability information SEI for SVC" Joint Video Team (JVT) of ISO/IEC MPEG & ITU-T VCEG (ISO/IEC JTC1/SC29/WG11 and ITU-T SG16 Q.6), [Online] Apr. 16, 2005, pp. 17-23,25-32,37-40, XP002446963 Busan, Korea Retrieved from the Internet: URL:http://ftp3.itu.ch/av-arch/jvt-site/2005_04Busan/JVT-O012.doc> [retrieved on Aug. 15, 2007].

Korean Office Action, dated Jun. 2, 2011, from corresponding Korean Application No. 10-2007-26155 filed Mar. 16, 2007.

* cited by examiner

SCALABLE VIDEO CODING/MULTIPLEXING COMPATIBLE WITH NON-SCALABLE DECODERS

CROSS REFERENCE TO OTHER APPLICATIONS

This application claims priority to U.S. Provisional Patent Application No. 60/782,807 entitled SCALABLE VIDEO CODING/MULTIPLEXING COMPATIBLE WITH NON-SCALABLE DECODERS filed Mar. 16, 2006, which is incorporated herein by reference for all purposes; and to U.S. Provisional Patent Application No. 60/785,796 entitled SCALABLE VIDEO CODING/MULTIPLEXING COMPATIBLE WITH NON-SCALABLE DECODERS filed Mar. 23, 2006, which is incorporated herein by reference for all purposes.

BACKGROUND OF THE INVENTION

In a scalable video coding/multiplexing scheme, it is desirable that the so-called base layer be compatible with a non-scalable video coding standard, e.g., H.264. It is also desirable that any multiplexing of additional scalable layers be carried out in such a way that non-scalable video decoders, which have no knowledge of scalability, will ignore all scalable layers and only decode the base layer.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
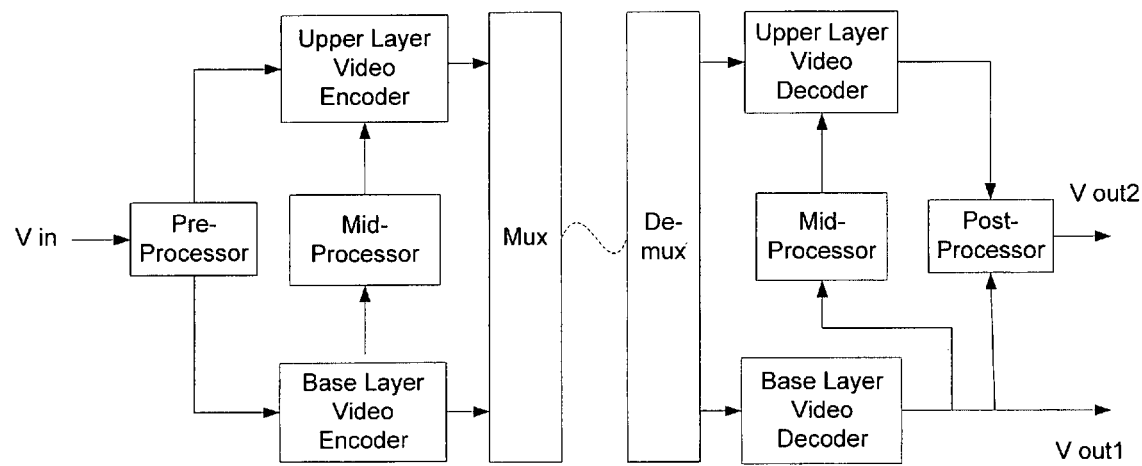
FIG. 1 is a block diagram illustrating an embodiment of a codec for scalable video coding.

FIG. 1 is a block diagram illustrating an embodiment of a codec for scalable video coding. In some embodiments, in a scalable video coding/multiplexing scheme the base layer is rendered compatible with a non-scalable video coding standard by assigning default values for the base layer to all necessary scalability parameters, e.g., priority id, dependency id, temporal level id, etc. For the base layer, a scalable decoder (e.g., the base layer decoder of FIG. 1) is configured to use for the base layer the default values for the scalability parameters, instead of transmitted scalability parameters, making it unnecessary to transmit scalability parameters for base layer data. By this means, the base layer can adhere in all ways to the non-scalable standard, and it is not necessary to transmit any scalability parameters in the base layer data. The base layer data may be used by a non-scalable decoder directly, without having to strip, filter out, discard, ignore, or otherwise not use without being confused by transmitted scalability parameter data.

Figure 2:
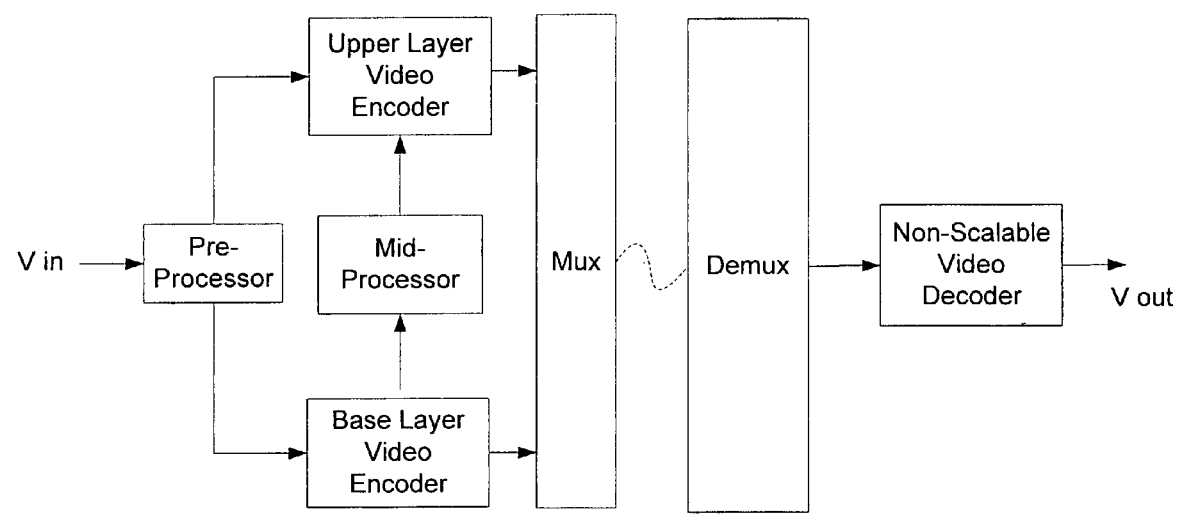
FIG. 2 is a block diagram illustrating an embodiment of a codec comprising a non-scalable video decoder configured to decode the base layer of a compatible scalable video stream.

FIG. 2 is a block diagram illustrating an embodiment of a codec comprising a non-scalable video decoder configured to decode the base layer of a compatible scalable video stream. In some embodiments, non-scalable video decoders, which have no knowledge of scalability, are enabled to ignore all scalable layers and only decode the base layer by tagging packets, called NAL units or NALUs in the H.264 video encoding standard, that are not associated with the base layer with values that non-scalable decoders know to discard. In some embodiments, non-scalable H.264 decoders, such as the non-scalable decoder of FIG. 2, are configured to decode only NALUs having nal_unit_type syntax element values defined in the non-scalable H.264 standard and to ignore (e.g., discard without decoding or attempting to decode) NALUs having nal_unit_type syntax element values not defined in the non-scalable H.264 standard.

Figure 3:
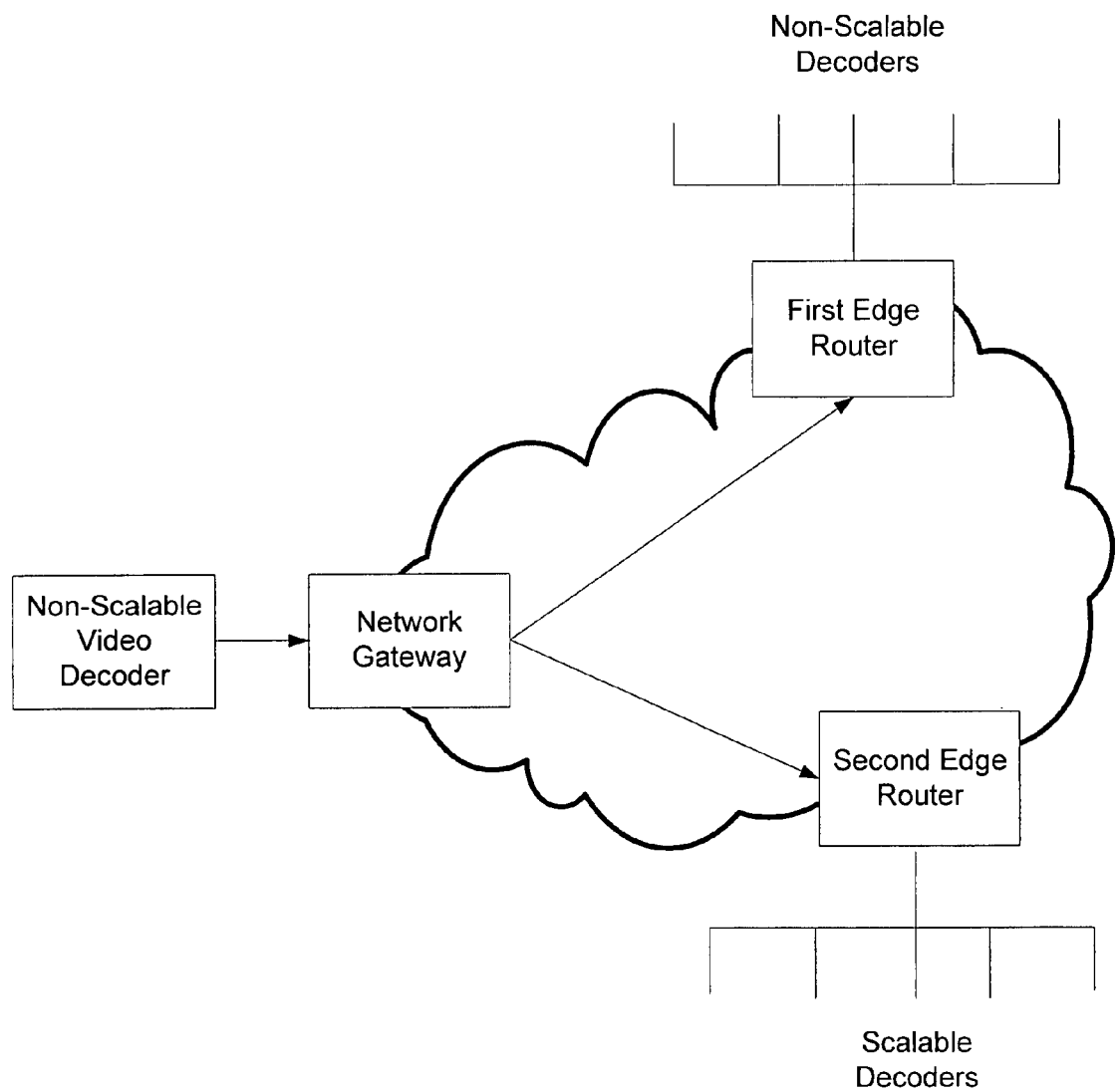
FIG. 3 is a block diagram illustrating an embodiment of a network gateway configured to route packets of video data based at least in part on whether a destination comprises a scalable or non-scalable decoder.

FIG. 3 is a block diagram illustrating an embodiment of a network gateway configured to route packets of video data based at least in part on whether a destination comprises a scalable or non-scalable decoder. In some embodiments, a network gateway or other network node, such as the network gateway of FIG. 3, is configured to route some NALUs to some destinations and other NALUs to other destinations. For example, if some destinations only contained non-scalable decoders (e.g., those associated with the first edge router of FIG. 3), then in some embodiments the gateway or other node would route to them only NALUs having nal_unit_type syntax element values defined in the non-scalable H.264 standard. Using this approach, network resources and/or bandwidth are not used to send to non-scalable decoders NALUs not usable by such decoders.

In some scalable video streams there may be more than one layer that conforms to the non-scalable standard, and in such cases it is desirable to identify such layers to decoders and/or gateways.

Thus, in some embodiments, different default scalability parameters are assigned to each non-scalable layer according to certain characteristics of that non-scalable layer. For example, in H.264 the default scalability parameters could depend on the sequence parameter set or picture parameter set of the non-scalable layer. This enables the scalable decoder to utilize any of the non-scalable layers as its base layer.

In some embodiments, a special NALU is inserted just before some or all of the non-scalable video NALUs. This special NALU indicates that the following NALU belongs to a layer in the scalable hierarchy, but that it's coding is compatible with the non-scalable standard. This special NALU could also contain scalability data pertaining to the following compatible NALU, e.g., priority id, dependency id, temporal level id, etc.

A non-scalable video decoder would ignore the special NALU and select one of the available non-scalable layers to decode and display. For example, the selection could be on the basis of profile and level of the non-scalable layers, or picture size. Or it could be by some other selection mechanism contained, for example, in a file format such as mp4. A gateway could use data in the special NALU to make routing decisions, or it could use mechanisms similar to those above that a decoder would use.

In some embodiments, the video data conforming to the non-scalable standard is contained in scalable NALUs, but in a form that is easily extractable for use by a non-scalable decoder. For example, in some embodiments the scalability data is contained in the front of the scalable NALUs. A gateway or preprocessor strips off the scalability data, changes the nal_unit_type syntax element value to a non-scalable value, and sends the result to one or more non-scalable decoders.

In some embodiments, the video data conforming to the non-scalable standard is contained in scalable NALUs having special nal_unit_type syntax element values or other syntax element values that identify the video data as being coded in a non-scalable form. In various embodiments, scalability data is contained in the front of these NALUs or in another prescribed location in the NALUs. A gateway or preprocessor strips off the scalability data, changes the nal_unit_type syntax element to a non-scalable value, and sends the result to one or more non-scalable decoders.

In some scalable video streams there may be some layers that, by themselves, do not conform to the non-scalable standard, but when combined with other layers do conform. For purposes of clarity we call these layers subordinate non-scalable layers. For example, with temporal scalability the base layer may conform to the non-scalable standard, but the subordinate non-scalable layers, by themselves, do not. However, when the subordinate non-scalable layers are combined correctly with the base layer, the overall result does conform to the non-scalable standard and can be decoded by non-scalable decoders.

In some embodiments, the subordinate non-scalable layers are labeled so that they can be easily identified by scalable decoders, preprocessors and/or gateways. In some embodiments, this is done by inserting a special NALU before the subordinate non-scalable layer NALUs. These special NALUs have nal_unit_type syntax element values or other syntax element values that identify the subordinate non-scalable layers. The subordinate non-scalable layer NALUs have nal_unit_type syntax element values conforming to the non-scalable standard. A gateway may then use data in the special NALUs to make its routing decisions. It may send only the base layer to some non-scalable decoders, the base layer plus some or all subordinate non-scalable layers to other non-scalable decoders, and some or all layers to scalable decoders.

In some embodiments, the video data of the subordinate non-scalable layers is contained in scalable NALUs, but in a form that is easily extractable for use by a non-scalable decoder. For example, in some embodiments the scalability data is contained in the front of the scalable NALUs. A gateway or preprocessor strips off the scalability data, changes the nal_unit_type syntax element value to a non-scalable value, and sends the result to non-scalable decoders.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of encoding video data, comprising:
receiving a video data;
encoding the video data in accordance with a scalable video coding scheme, in a manner that renders a base layer to be compatible with a non-scalable video encoding standard, including assigning for the base layer default values to one or more scalability parameters;
including in the coded video data, an identification data that identifies those portions of the encoded video data that conform to the non-scalable video encoding standard, said identification provided in a packet separate from the identified portions; and
transmitting the coded video data such that the layer assigned default scalability parameter values is transmitted without scalability parameters associated with the base layer.

2. A method as recited in claim 1, wherein the one or more scalability parameters include one or more of the following: priority id, dependency id, and temporal level id.

3. A method as recited in claim 1, wherein the non-scalable video encoding standard comprises the H.264 video encoding standard.

4. A method as recited in claim 1, further comprising configuring a scalable decoder to use for at least the base layer said default values for said one or more scalability parameters, instead of transmitted scalability parameters.

5. A method as recited in claim 1, wherein the encoded video data includes more than one layer that conforms to the non-scalable video encoding standard and further comprising assigning for each non-scalable layer, based at least in part on a characteristic of that non-scalable layer, a corresponding set of one or more default scalability parameter values.

6. A method as recited in claim 5, wherein the characteristic comprises one or more of the following: sequence parameter set and picture parameter set.

7. A method as recited in claim 1, wherein including in the encoded video data an identification data comprises including in a stream of packets, in a position prior in transmission order to one or more following packets associated with a scalable layer having coding that is compatible with the non-scalable video encoding standard, a special packet that identifies the one or more following packets as being associated with a scalable layer having coding that is compatible with the non-scalable video encoding standard.

8. A method as recited in claim 7, wherein the special packet includes for the one or more following packets with which the special packet is associated default values for one or more scalability parameters.

9. A method as recited in claim 7, further comprising configuring a non-scalable decoder to ignore the special packet and select a non-scalable layer to decode.

10. A method as recited in claim 9, wherein the selection is based at least in part on one or more of the following: profile and level of the non-scalable layers and picture size.

11. A method as recited in claim 7, further comprising configuring a forwarding node to make a forwarding decision based at least in part on the identification data.

12. A method as recited in claim 11, wherein the forwarding decision is made based at least in part on a capability of a downstream decoder to which the encoded video data or a portion thereof is to be forwarded.

13. A method as recited in claim 11, wherein the forwarding decision includes determining which portions of the encoded video data to forward.

14. A method of decoding video data, comprising:
receiving an encoded video data;
receiving in the encoded video data, an identification data that identifies those portions of the encoded video data that conform to the non-scalable video encoding standard, said identification provided in a packet separate from the identified portions; and
decoding the encoded video data according to a scalable decoding scheme, including using for a base layer default values for one or more scalability parameters;
wherein for a layer decoded with default scalability parameter values the coded video data corresponding to the layer is received without scalability parameters associated with the layer.

15. A video encoding system, comprising:
a communication interface configured to receive a video data;
a hardware processor coupled to the communication interface and configured to encode the video data in accordance with a scalable video coding scheme, in a manner that a base layer to be compatible with a non-scalable video encoding standard, including assigning for the base layer default values to one or more scalability parameters, wherein for a layer assigned default scalability parameter values, the coded video data corresponding to the layer is transmitted without the default scalability parameters associated with the layer and to include in the coded video data, an identification data that identifies those portions of the encoded video data that conform to the non-scalable video encoding standard, said identification provided in a packet separate from the identified portions; and
a buffer device to store the coded video data.

16. A system as recited in claim 15, wherein the one or more scalability parameters include one or more of the following: priority id, dependency id, and temporal level id.

17. A system as recited in claim 15, wherein the encoded video data includes more than one layer that conforms to the non-scalable video encoding standard and the video encoder is further configured to assign for each non-scalable layer, based at least in part on a characteristic of that non-scalable layer, a corresponding set of one or more default scalability parameter values.

18. A system as recited in claim 15, wherein the video encoder is configured to include the identification data in the encoded video data at least in part by including in a stream of packets, in a position prior in transmission order to one or more following packets associated with a scalable layer having coding that is compatible with the non-scalable video encoding standard, a special packet that identifies the one or more following packets as being associated with a scalable layer having coding that is compatible with the non-scalable video encoding standard.

19. A system as recited in claim 18, wherein the special packet includes for the one or more following packets with which the special packet is associated default values for one or more scalability parameters.

20. A system as recited in claim 15, wherein the video encoder comprises a processor configured to execute computer instructions for encoding the video data.

21. A computer program product for encoding video data, the computer program product being embodied in a non-transitory computer readable medium and comprising computer instructions for:
receiving a video data;
encoding the video data in accordance with a scalable video coding scheme, in a manner that renders a base layer to be compatible with a non-scalable video encoding standard, including assigning for the base layer default values to one or more scalability parameters,
including in the coded video data, an identification data that identifies those portions of the encoded video data that conform to the non-scalable video encoding standard, said identification provided in a packet separate from the identified portions, and
transmitting the coded video data such that the layer assigned default scalability parameter values is transmitted without scalability parameters associated with the layer.

22. A computer program product as recited in claim 21, wherein the encoded video data includes more than one layer that conforms to the non-scalable video encoding standard and further comprising computer instructions for assigning for each non-scalable layer, based at least in part on a characteristic of that non-scalable layer, a corresponding set of one or more default scalability parameter values.

23. A computer program product as recited in claim 21, wherein including in the encoded video data an identification data comprises including in a stream of packets, in a position prior in transmission order to one or more following packets associated with a scalable layer having coding that is compatible with the non-scalable video encoding standard, a special packet that identifies the one or more following packets as being associated with a scalable layer having coding that is compatible with the non-scalable video encoding standard.

24. A video decoding system, comprising:
a communication interface configured to receive an encoded video data;
a buffer device to receive and store the encoded video data; and
a hardware processor coupled to the communication interface and configured to decode the encoded video data according to a scalable decoding scheme, including using for a base layer default values for one or more scalability parameters, wherein for a layer decoded with default scalability parameter values the coded video data corresponding to the layer is received without scalability parameters associated with the layer
wherein included in the coded video data is an identification data that identifies those portions of the encoded video data that conform to the non-scalable video encoding standard, said identification provided in a packet separate from the identified portions.

25. A computer program product for decoding encoded video data, the computer program product being embodied in a non-transitory computer readable medium and comprising computer instructions for:
receiving an encoded video data; and
receiving with the coded video data, an identification data that identifies those portions of the encoded video data that conform to the non-scalable video encoding standard, said identification provided in a packet separate from the identified portions; and
decoding the encoded video data according to a scalable decoding scheme, including using for a base layer default values for one or more scalability parameters wherein for a layer decoded with default scalability parameter values the coded video data corresponding to the layer is received without scalability parameters associated with the layer.

\* \* \* \* \*